(12) United States Patent
Mazet et al.

(10) Patent No.: US 11,142,307 B2
(45) Date of Patent: Oct. 12, 2021

(54) LEAD-LAG DAMPER INTEGRATED INSIDE A BLADE OF A ROTOR

(71) Applicant: AIRBUS HELICOPTERS, Marignane (FR)

(72) Inventors: Stephane Mazet, Rognac (FR); Jean-Romain Bihel, Le Rove (FR); Mathias Fournier, Aix en Provence (FR); Sylvain Berthalon, Velaux (FR)

(73) Assignee: AIRBUS HELICOPTERS, Marignane (FR)

( * ) Notice: Subject to any disclaimer, the term of this patent is extended or adjusted under 35 U.S.C. 154(b) by 588 days.

(21) Appl. No.: 15/728,750

(22) Filed: Oct. 10, 2017

(65) Prior Publication Data
US 2018/0105265 A1 Apr. 19, 2018

(30) Foreign Application Priority Data
Oct. 14, 2016 (FR) ...................................... 1601495

(51) Int. Cl.
*B64C 27/51* (2006.01)
*B64C 27/00* (2006.01)
(Continued)

(52) U.S. Cl.
CPC ............ *B64C 27/51* (2013.01); *B64C 27/001* (2013.01); *B64C 27/35* (2013.01); *B64C 27/48* (2013.01)

(58) Field of Classification Search
CPC ....... B64C 27/001; B64C 27/35; B64C 27/48; B64C 27/51; B64C 27/54; B64C 27/72;
(Continued)

(56) References Cited

U.S. PATENT DOCUMENTS

| 3,762,834 A | 10/1973 | Bourquardez et al. |
| 3,842,945 A * | 10/1974 | Potter ...................... B64C 27/51 188/268 |

(Continued)

FOREIGN PATENT DOCUMENTS

| CN | 1842463 A | 10/2006 |
| CN | 101526122 A | 9/2009 |

(Continued)

OTHER PUBLICATIONS

French Search Report for French Application No. FR 1601495, Completed by the French Patent Office, dated Jul. 28, 2017, 9 pages.
(Continued)

*Primary Examiner* — Kenneth Bomberg
*Assistant Examiner* — Julian B Getachew
(74) *Attorney, Agent, or Firm* — Brooks Kushman P.C.

(57) ABSTRACT

A lead-lag damper arranged inside a blade of a rotor of a rotary wing aircraft. The lead-lag damper comprises an inner strength member provided with a cage in which a ball-joint connection is arranged, an outer strength member for securing to the blade, and an elastomer material member arranged between the two strength members. The two strength members and the elastomer material member extending beyond the zone around the cage so that the relative movements between two strength members resulting from the movements of the blade are damped by deformations of the elastomer material member, at least a portion of the lead-lag damper being designed to occupy a portion of the inside of the blade that is conventionally filled with foam.

22 Claims, 4 Drawing Sheets

(51) Int. Cl.
*B64C 27/35* (2006.01)
*B64C 27/48* (2006.01)

(58) Field of Classification Search
CPC ........ F16F 13/00; F16F 15/12; F16F 2222/04; F16F 2224/025
See application file for complete search history.

(56) References Cited

U.S. PATENT DOCUMENTS

| | | | |
|---|---|---|---|
| 4,249,862 A * | 2/1981 | Waddington | B64C 27/51 416/134 A |
| 4,504,193 A * | 3/1985 | Mouille | B64C 27/32 416/134 A |
| 4,566,677 A * | 1/1986 | Le Pierres | F16F 9/30 188/268 |
| 4,676,720 A | 6/1987 | Niwa et al. | |
| 4,915,585 A | 4/1990 | Guimbal | |
| 5,228,834 A | 7/1993 | Yamamoto et al. | |
| 5,407,325 A * | 4/1995 | Aubry | B64C 27/51 416/106 |
| 6,004,099 A * | 12/1999 | Bansemir | B64C 27/33 416/230 |
| 6,196,800 B1 | 3/2001 | Bauer et al. | |
| 7,811,061 B2 | 10/2010 | Bianchi et al. | |
| 8,177,202 B2 | 5/2012 | De Forges et al. | |
| 8,622,703 B2 | 1/2014 | Girard et al. | |
| 8,764,396 B2 | 7/2014 | Stamps et al. | |
| 8,857,581 B2 | 10/2014 | Stamps et al. | |
| 2010/0247288 A1 * | 9/2010 | Russell | B64C 27/35 415/1 |
| 2011/0274548 A1 | 11/2011 | Stamps et al. | |
| 2016/0176279 A1 | 6/2016 | Inatomi | |

FOREIGN PATENT DOCUMENTS

| | | |
|---|---|---|
| CN | 101939221 A | 1/2011 |
| EP | 0097885 A3 | 6/1983 |
| EP | 0097885 | 1/1984 |
| EP | 0615904 A1 | 9/1994 |
| EP | 1640266 A1 | 3/2006 |
| EP | 2778051 A1 | 9/2014 |
| EP | 2867558 A1 | 5/2015 |
| FR | 2228663 A1 | 12/1974 |
| FR | 2263151 A2 | 10/1975 |
| FR | 2305343 A2 | 10/1976 |
| FR | 2427251 A1 | 12/1979 |
| FR | 2630703 A1 | 11/1989 |
| FR | 2680845 A1 | 3/1993 |
| FR | 2898581 A1 | 9/2007 |
| FR | 2929675 A1 | 10/2009 |
| FR | 2943621 A1 | 10/2010 |
| GB | 1528226 A | 10/1978 |
| WO | 2014003940 A1 | 1/2014 |

OTHER PUBLICATIONS

Chinese Office Action and Search Report dated Jun. 28, 2020, Application No. 201710942808.5, Applicant Airbus Helicopters, 16 Pages.

* cited by examiner

LEAD-LAG DAMPER INTEGRATED INSIDE A BLADE OF A ROTOR

CROSS-REFERENCE TO RELATED APPLICATIONS

This application claims priority to French patent application No. FR 16 01495 filed on Oct. 14, 2016, the disclosure of which is incorporated in its entirety by reference herein.

BACKGROUND OF THE INVENTION

(1) Field of the Invention

The present invention lies in the technical field of rotors for rotary wing aircraft, and more particularly of means for damping the movements of the blades of such rotors, and in particular their lead-lag (or "drag") movements. The invention relates to installing such damper means inside the blades of a rotor of a rotary wing aircraft.

The invention relates to a lead-lag damper integrated inside the blades of a rotor of the rotary wing aircraft, and also to a blade fitted with such a damper, and to a rotor of a rotary wing aircraft having such blades.

(2) Description of Related Art

In general manner, a rotor of a rotary wing aircraft comprises a hub driven in rotation about an axis of rotation that is substantially vertical by an outlet shaft from a main power transmission gearbox (MGB), and at least two blades that are respectively fastened to the hub via one or more appropriate hinge means, e.g. a dedicated laminated spherical abutment for each blade. A cuff may also be arranged between the blade and the hub and fastened to the root of the blade, with the spherical abutment then connecting the cuff to the hub.

The laminated spherical abutment then enables the blade to perform the following three movements in rotation:
- a movement in rotation about a substantially horizontal flapping axis;
- a movement in rotation about a substantially vertical lead-lag axis; and
- a movement in rotation about a pitch axis of the blade, the pitch axis being situated substantially longitudinally along the span of the blade.

While the rotor is rotating, these angular movements may be different for each blade as a function of its azimuth position. Furthermore, the oscillations of each blade, in particular about the lead-lag axis, can become coupled in unstable manner with elastic-deformation modes or movements in the airframe of the aircraft while in flight, and also with elastic-deformation modes or movements in the airframe and the landing gear while the aircraft is standing on the ground. Such phenomena, known as "ground resonance" and "air resonance" can be dangerous for the aircraft when the resonant frequency of the oscillations of the blades relative to axes that are stationary relative to the aircraft is close to one of the resonant frequencies of oscillations of the aircraft relative to the same axes.

In order to avoid catastrophic coupling between the lead-lag movements of the blades and movements of the airframe of the aircraft or of the airframe together with the landing gear, damper means are provided for each blade, for providing damping relative to the lead-lag axis of the blade, which means are connected to each of the blades respectively. Such damper means, referred to as a "lead-lag damper" are subjected to forced movements due to the movements relative to the pitch, flapping, and lead-lag axes of the blade. Nevertheless, the lead-lag damper has little influence on those movements.

The lead-lag damper is also subjected to movements at the resonant lead-lag frequency of the blade. These movements are not damped naturally, for example by aerodynamic forces. The lead-lag damper consequently acts to oppose any vibratory phenomenon. In order to ensure stability of the aircraft, damping the lead-lag movements of the blades thus serves to avoid the phenomena of ground resonance and of air resonance.

Such damping may be obtained in particular by using lead-lag dampers connecting each blade to the hub of the rotor, e.g. as described in Document FR 2 427 251. That damping can also be achieved by installing respective lead-lag dampers between adjacent pairs of blades, e.g. as described in Document FR 2 630 703. These can be referred to as "inter-blade lead-lag dampers".

The lead-lag damper may also be arranged inside the blade when it is fastened directly to the hub, e.g. as described in Document FR 2 305 343, or inside a cuff when the blade has one, as described for example in Documents FR 2 228 663 and FR 2 263 151.

Documents EP 1 640 266, EP 0 097 885, U.S. Pat. Nos. 4,676,720, and 5,228,834 also describe lead-lag damper devices integrated in a cuff serving to connect a blade to the hub of a rotor.

Whatever the way they are installed, such lead-lag dampers include resilient return means of determined stiffness and damping, of the viscous or dry type, in order to combat resonance phenomena. For example, Document FR 2 929 675 describes a visco-elastic lead-lag damper formed by mutually parallel rigid elements that are secured to one another via connection layers made of elastomer material. That visco-elastic lead-lag damper has a transverse plane of symmetry.

In order to arrange a lead-lag damper inside the blade, the hub according to those above-cited documents is generally made of composite materials and is star-shaped. The hub comprises a central body and flexible arms. Each blade or each cuff is connected firstly to the hub by means of the spherical abutments, and secondly to one of the flexible arms via a ball-joint connection and resilient and/or elastomer means forming the lead-lag damper proper. That ball-joint connection is connected to a flexible arm with a degree of freedom to move in translation along the longitudinal axis of the blade.

Nevertheless, the use of a lead-lag damper that is outside the blade, whether between blades or else arranged between a blade and the hub, makes it difficult for the blade to be fully faired aerodynamically. Consequently, such external dampers give rise to the appearance of aerodynamic drag and to aerodynamic disturbances, that can be large.

Likewise, the use of a cuff arranged between the blade and the hub includes appendices, e.g. corresponding to the fastener means of the cuff, thereby making it difficult to fair and/or liable to generate the appearance of aerodynamic drag and aerodynamic disturbances.

Nevertheless, solutions for fairing a cuff have been developed, as described in Document EP 2 778 051. However those solutions generally present a discontinuity between the streamlined shape of the blade and the fairing of the cuff, thereby reducing the effectiveness of the fairing and of any improvements in the aerodynamic performance of the blade.

The absence of a cuff makes it easier to fair the root zone of the blade. For example, Document FR 2 898 581 describes a blade having a spar spread over a bottom branch and a top branch at the root of the blade, a lead-lag damper arranged inside the blade, and a sleeve that is hollow and faired. The sleeve is secured to the bottom and top branches, thereby contributing to transmitting forces, and it is faired, thereby providing continuity with the streamlined shape of the blade and thus contributing to limiting aerodynamic drag and aerodynamic disturbances affecting the blade.

The movements of each blade about the lead-lag axis, and mainly in a plane perpendicular to the axis of rotation of the hub of the rotor, and also about the flapping and pitch axes, cause large forces to appear in the lead-lag damper to which the blade is connected. Nevertheless, depending on their magnitudes, those forces are not always dissipated completely by the lead-lag damper, in particular on heavy aircraft. Consequently, parasitic forces appear in the blade and in particular in the spherical abutment. Such parasitic forces contribute in particular to degrading the spherical abutment, and consequently to reducing its reliability and its lifetime.

Finally, the hub needs to be dimensioned so as to withstand the forces transmitted between the hub and each blade, and in particular the centrifugal forces due to the rotation of the blade. For a heavy aircraft, the centrifugal forces can be considerable and make it necessary for the central body of the hub to have large dimensions, in particular if it is made out of composite materials. Such large dimensions make it difficult to install on the rotor of the aircraft.

The technological background of the invention also includes Documents US 2016/0176279, EP 0 615 904, and EP 2 867 558.

BRIEF SUMMARY OF THE INVENTION

An object of the present invention is thus to provide a lead-lag damper for the blades of a rotor of a rotary wing aircraft that makes it possible to avoid the above-mentioned limitations, in particular in order to limit, or even eliminate, the parasitic forces appearing in the blade and the spherical abutment connecting a blade to the hub of the rotor, thereby increasing the reliability of each spherical abutment.

Another object of the present invention is to enable each blade of the rotor to be faired substantially as far as its root, thereby limiting its aerodynamic drag and the appearance of aerodynamic disturbances affecting the blade and the rotor while the aircraft is in flight.

Another object of the present invention is to provide a blade fitted with such a lead-lag damper, and a rotor provided with such blades.

According to the invention, a lead-lag damper is for a blade of a rotary wing aircraft rotor. The rotor comprises at least two blades and a hub driven in rotation. The rotor thus drives the blades in rotation. The lead-lag damper of the invention is preferably fitted to each blade of the rotor.

The lead-lag damper of the invention comprises:
a longitudinal axis;
a ball-joint connection for connecting to the hub;
two strength members, one of the two strength members being referred to as an "inner" strength member and being provided with a cage in which the ball-joint connection is arranged, the other of the two strength members being referred to as an "outer" strength member and being designed to be secured to the blade; and
an elastomer material member arranged between the inner strength member and the outer strength member.

The cage may form an integral portion of the inner strength member and may be formed by a housing in the inner strength member. Preferably, the cage is a fitting distinct from the inner strength member, e.g. being fastened to the inner strength member by screw-fastener means.

The lead-lag damper of the invention is particularly suitable for the blades of a main rotor, i.e. a rotor providing lift or even propulsion to a rotary wing aircraft. Nevertheless, such a lead-lag damper may also be fitted to the blades of an anti-torque auxiliary rotor or indeed to propellers for pushing or pulling an aircraft.

The elastomer material member is constituted mainly by an elastomer material or a material having equivalent mechanical properties. The inner strength member and the outer strength member are sufficiently rigid to withstand the stresses imposed by the movements of the blades and the forces that pass via the blades. The inner strength member and the outer strength member may be made of metal or of composite materials, for example.

The lead-lag damper of the invention is remarkable in that the two strength members and the elastomer material member are arranged on both sides of the cage and extend, at least along the longitudinal axis of the lead-lag damper, beyond a central zone in which the cage is situated, the central zone occupying a length longitudinally that is not less than the length of the cage, so that relative movements between the two strength members resulting from the movements of the blade are damped by deformations of the elastomer material member of the lead-lag damper of the invention, the lead-lag damper being designed to be arranged at least in part inside the blade.

The longitudinal axis of the lead-lag damper coincides substantially with the longitudinal axis of the blade in which the lead-lag damper is arranged.

Specifically, a blade extends longitudinally along the span of a first end situated at the root of the blade for fastening to the hub of the rotor, to a second end that is referred to as the "free" end. Relative to the rotor, it can be understood that the blade extends radially from the first end to the second end. It may be observed that the term "longitudinal" should be understood in the span direction of a blade, the longitudinal axis of the blade extending in the span direction of the blade and generally coinciding with the pitch axis of the blade.

Furthermore, the lead-lag damper has a transverse axis that is substantially perpendicular to the longitudinal axis of the lead-lag damper. Once the lead-lag damper has been arranged in the blade, this transverse axis extends transversely from a leading edge to a trailing edge of the blade. Finally, the lead-lag damper has a vertical axis that is substantially perpendicular to its transverse axis and its longitudinal axis.

In conventional manner, the blade comprises at least one spar together with an outer covering also known as a "skin". The outside surface of the skin is constituted for the most part by a continuous succession of aerodynamic profiles. As a result, at least one spar acts via a spherical abutment to fasten the blade to the hub directly or else optionally via a cuff.

The lead-lag damper of the invention includes the central zone, a zone referred to as an "upstream" zone, and a zone referred to as a "downstream" zone. The terms "upstream" and "downstream" should be understood relative to the longitudinal axis of the lead-lag damper of the blade in the span direction of the blade going from the first end of the blade towards its free end. The upstream zone is situated upstream from the central zone and is situated between the root of the blade and the central zone. The downstream zone is situated downstream from the central zone and is situated between the free end of the blade and the central zone. The central zone is adjacent to the upstream zone and to the downstream zone. These zones are preferably delimited by respective vertical planes substantially perpendicular to the longitudinal axis of the lead-lag damper. The length of the central zone along the longitudinal axis is not less than the length of the cage along the longitudinal axis.

The two strength members, namely the inner strength member and the outer strength member, are arranged on both sides of the cage and along the longitudinal axis, thus being situated on both sides of a vertical first plane perpendicular to the longitudinal axis and passing via the center of the cage of the inner strength member, with the center of the cage corresponding to the center of rotation of the ball-joint connection of the lead-lag damper. The two strength members thus cover the upstream, central, and downstream zones. As a result, the two strength members extend beyond the central zone, which is situated around the cage. Furthermore, the two strength members are also arranged on both sides of the cage along the transverse axis and are thus situated on both sides of a vertical second plane perpendicular to the transverse axis and passing via the center of the cage. Finally, the two strength members are also arranged on both sides of the cage along the vertical axis and are thus situated on both sides of a horizontal third plane perpendicular to the vertical axis and passing via the center of the cage.

The inner strength member and the outer strength member respectively comprise at least two walls. Furthermore, the inner strength member has at least one main partition connecting together at least two walls of the inner strength member. Each main partition may for example be parallel to the vertical axis.

The outer strength member may also include at least one main partition connecting together at least two walls of the outer strength member. Nevertheless, the outer strength member may also comprise walls that are distinct and not rigidly connected together by an element of the outer strength member.

The shapes and the dimensions of the inner and outer strength members are imposed by the inside shape of the blade in which the lead-lag damper of the invention is arranged. For example, the two strength members are respectively symmetrical firstly relative to the vertical second plane and secondly relative to the horizontal third plane, these two planes passing via the center of the cage of the inner strength member.

Both strength members are preferably of a shape that tapers along the longitudinal axis of the lead-lag damper of the invention. Thus, the section of each strength member taken perpendicularly to the longitudinal axis decreases going along the span of the blade from its root towards its free end in order to match the shape of the blade in which the lead-lag damper is arranged. Nevertheless, the two strength members could alternatively be symmetrical relative to the vertical first plane passing through the center of the cage, when such symmetry is appropriate for the inside shape of the blade.

The elastomer material member is also arranged on both sides of the cage along the vertical first and second planes passing via the center of the cage and also relative to the horizontal third plane passing via the center of the cage. The elastomer material member thus extends beyond the central zone situated around the cage and covers at least the upstream and downstream zones.

Furthermore, the upstream and downstream zones have respective lengths along the longitudinal axis that are longer than the length of the central zone in which the cage and the ball-joint connection are situated. Specifically, the area of the elastomer material member along the longitudinal axis covering at least the upstream and downstream zones is at least twice the area conventionally occupied by the elastomer material arranged solely in the central zone of a lead-lag damper inside a blade, e.g. such as described in Documents FR 2 305 343 and FR 2 228 663.

For example, the upstream and downstream zones have dimensions along the longitudinal axis that are not less than twice the dimensions of the central zone.

Consequently, when the lead-lag damper is arranged inside a blade, the downstream zone occupies a portion of the inside of the blade that is conventionally filled with a filler material such as foam.

The elastomer material member is arranged between the inner strength member and the outer strength member and is secured to both of the strength members. By way of example, the elastomer material member is adhesively bonded to each of the two strength members. The elastomer material member preferably adheres both to the walls and to the partitions of the respective inner and outer strength members. Nevertheless, the elastomer material member could adhere solely to the walls of the respective inner and outer strength members, or indeed solely to their partitions. The elastomer material member may also adhere to a fraction of the walls of the inner and outer strength members, together with a fraction of their partitions.

Furthermore, the elastomer material member thus enables the walls of the outer strength member to be connected together by means of the inner strength member, and possibly by means of the secondary partitions of the outer strength member, in particular when the outer strength member has distinct walls.

Under all circumstances, the elastomer material member thus enables limited relative movements between the two strength members while accompanying deformations of the elastomer material member, e.g. as a result of forces being applied to one and/or the other of the two strength members. These deformations of the elastomer material member thus enable energy to be dissipated by transforming into heat at least some and possibly all of the forces applied to the inner strength member and/or the outer strength member. Consequently, these forces are dissipated at least in part and possibly completely by these deformations of the elastomer material member.

The lead-lag damper is for fitting to each blade of a rotor of a rotary wing aircraft. Each blade is configured to be connected to a hub of the rotor via a spherical abutment. The lead-lag damper is arranged at least in part inside the blade, in the proximity of its root. Preferably, the lead-lag damper is arranged in full inside the blade. The outer strength member of the lead-lag damper is then secured to the blade and the inner strength member is connected to the hub via the ball-joint connection. By way of example, the hub may be star-shaped as described in Documents FR 2 305 343 and FR 2 228 663. The ball-joint connection is connected to the hub preferably with at least one degree of freedom to move in translation along the longitudinal axis of the blade, e.g. by means of a sliding pivot connection.

As mentioned above, when the rotor is in rotation, each blade of the rotor may move in rotation about a lead-lag axis, a flapping axis, and/or a pitch axis, and may transmit large forces directly to the lead-lag damper to which it is connected. Advantageously, with the elastomer material member extending between the central zone, the lead-lag damper of the invention makes it possible to dissipate the forces completely, including on heavy aircraft. Consequently, no parasitic force appears in the blade, and in particular in the spherical abutment, thus making it possible to improve the lifetime of the spherical abutment.

Advantageously, the lead-lag damper of the invention thus contributes to ensuring firstly that the aircraft is stable by preventing ground resonance and air resonance phenomena, and secondly to avoiding the appearance of parasitic forces in the blade, thereby improving its reliability.

This improvement in the behavior of the blade is the result of increasing the dimensions of the elastomer material member that is used, since specifically it occupies at least the upstream and downstream zones, the downstream zone occupying a portion of the inside of the blade that is conventionally occupied by a filler material.

Preferably, the elastomer material member comprises at least two distinct blocks. Advantageously, each elastomer material block can thus be formed independently of every other block of the elastomer material member, even though each block is secured to the inner strength member and to the outer strength member. Consequently, the lead-lag damper of the invention is more effective in dissipating the forces induced by the deformations of the elastomer material member as a result of the movements of the blade. For example, the elastomer material member may have at least two distinct blocks, at least one first block arranged in the upstream zone and at least one second block arranged in the downstream zone.

In addition, using distinct blocks advantageously avoids a failure in one portion of the elastomer material member, such as a block tearing, propagating to the other blocks of the elastomer material member.

Furthermore, the lead-lag damper of the invention acts mainly to damp the movements of the blade about its lead-lag axis, mainly in a plane perpendicular to the axis of rotation of the hub of the rotor, which movements give rise to relative movements between the two strength members of the lead-lag damper, mainly parallel to the transverse axis of the blade, and consequently it acts to damp the appearance of forces induced by the deformations of the elastomer material member which are substantially parallel to the transverse axis and thus substantially parallel to the transverse axis of the lead-lag damper. Specifically, each block of the elastomer material member is stressed mainly in shear.

In order to adapt as well as possible to these shear stresses on the elastomer material member, the lead-lag damper may have walls and partitions extending transversely, i.e. substantially parallel to its transverse axis in order to maximize the transverse size of each block of the elastomer material member and optimize mainly the shear behavior of the elastomer material member.

The lead-lag damper may also have walls and partitions constituted by shapes that are not plane and that are adapted to the shear stresses of the elastomer material member. For example, certain partitions of the inner strength member and/or of the outer strength member may be partially cylindrical in shape about an axis passing substantially through the focal point of the spherical abutment connecting the blade to the hub and parallel to the vertical axis of the lead-lag damper of the invention. The focal point of the spherical abutment may coincide with the center of the spherical abutment or it may be offset a little from the center, depending on the deformations to which the spherical abutment is subjected. These partitions are then in the form of truncated cylinders of circular section.

In another example, certain partitions of the inner strength member and/or of the outer strength member may be partially spherical in shape, being centered on the focal point of the spherical abutment. Likewise, the walls may also be partially spherical in shape, being centered on this focal point of the spherical abutment.

The lead-lag damper may also have walls and partitions, some of which may be plane and substantially parallel to the transverse axis of the lead-lag damper, while others are not plane.

Advantageously, the inner strength member and the outer strength member of the lead-lag damper may have a plurality of secondary partitions that are in contact with the elastomer material member. These secondary partitions thus enable the contact areas between the elastomer material member and each of the two strength members to be increased. These secondary partitions may be arranged equally well in the upstream zone and in the downstream zone of the lead-lag damper of the invention.

As mentioned above, these secondary partitions may be substantially transverse, i.e. substantially parallel to the transverse axis of the lead-lag damper, or they might not be plane, e.g. they may be cylindrical or spherical in shape, so as to adapt as well as possible to the shear stresses of the elastomer material member.

For example, each main partition and each secondary partition of the two strength members may be parallel to the vertical first plane and thus perpendicular to its longitudinal axis.

Each main partition and each secondary partition of these two strength members may also be spherical in shape, being centered on the focal point of the spherical abutment connecting the blade to the hub.

Advantageously, these secondary partitions make it possible to subdivide the elastomer material member and increase the number of blocks of this elastomer material member. Each block of the elastomer material member is then arranged between a main partition or a secondary partition of the inner strength member and a main partition or a secondary partition of the outer strength member in each zone that includes such partitions. Each block is preferably secured to both of these partitions. Consequently, and as mentioned above, increasing the number of blocks makes it possible to increase the effectiveness of the lead-lag damper by dissipating more effectively the forces induced by the deformations of the elastomer material member that result from the movements of the blade.

Nevertheless, these secondary partitions may subdivide the elastomer material member in part only and be positioned in slots or appropriate shapes in the elastomer material member. Under such circumstances, the secondary partitions do not subdivide the elastomer material member into a plurality of blocks.

By way of example, the choice of one or more blocks arranged in association with these main and secondary partitions of the two strength members may depend on the way in which the elastomer material member is fabricated or on the levels of stress to which the lead-lag damper of the invention is subjected.

Furthermore, a block of the elastomer material member may be arranged between the inner strength member and the outer strength member such that the block is of section that is substantially constant along the block. By way of example, this substantially constant section is perpendicular to a middle line of the block.

Likewise, a block of the elastomer material member may be arranged between the inner strength member and the outer strength member so that the block is of a section that varies along the block in order to ensure that the block is stressed uniformly and with stresses that are substantially equal in each of its sections during relative movements between the inner strength member and the outer strength member. By way of example, this varying section may be perpendicular to a middle line of the block. By way of example, the thickness of the block may vary along the longitudinal axis of the lead-lag damper in compliance with a predefined relationship.

Furthermore, in order to increase the stiffness of a block of the elastomer material member and thus limit its deformations, an insert may be embedded in the block. By way of example, the insert may be made of metal or of composite materials, or indeed out of plastics material.

Furthermore, in order to avoid the appearance of additional parasitic forces within the lead-lag damper and consequently within the blade, the forces induced by the deformations of the elastomer material member as a result of the relative movements of the two strength members may be substantially balanced and uniform on both sides of the cage.

Since the relative movements between the two strength members of the lead-lag damper are mainly parallel to the transverse axis of the lead-lag damper, the distribution of the elastomer material member on both sides of the cage is configured so that the forces induced by the deformations of the elastomer material member as a result of these relative movements between the two strength members are distributed in substantially balanced and uniform manner on both sides of the cage, at least relative to the vertical first plane passing via the center of the cage.

Preferably, and in order to ensure that the forces induced by the deformations of the elastomer material member resulting from these relative movements between the two strength members are distributed in substantially uniform and balanced manner on both sides of the cage not only relative to the vertical first plane passing via the center of the cage, but also relative both to the vertical second plane passing via the center of the cage and also relative to the horizontal third plane passing via the center of the cage, the way the elastomer material member is distributed around the cage is configured so that the center of gravity of these induced forces is situated at the center of the cage. Thus, these induced forces are well balanced and made uniform on both sides of the cage, thereby avoiding the appearance of additional parasitic forces within the lead-lag damper.

In addition, in order to limit the risks of degrading the elastomer material member, it is possible for there to be no elastomer material member arranged in the central zone where the cage of the ball-joint connection is situated. As a result, the elastomer material member is affected little or not at all by the heating of the ball-joint connection, thus making it possible to limit any risk of the elastomer material member being degraded, and enabling its lifetime and its effectiveness to be improved.

When the central zone does not include a block of the elastomer material member, the lead-lag damper may then have blocks of the elastomer material member that are not adjacent, being situated solely in the upstream and downstream zones.

Furthermore, when the central zone does not include a block of the elastomer material member, the inner strength member may have fins in this central zone that are arranged around the cage. These fins serve firstly to dissipate the heat generated at the ball-joint connection, and secondly advantageously to participate in providing the inner strength member with mechanical strength. Furthermore, eliminating the elastomer material member in this central zone can also make it possible to increase the dimensions of the ball-joint connection.

The present invention also provides a blade for a rotor of a rotary wing aircraft and including a lead-lag damper as described above.

In conventional manner, the blade has at least one spar and a skin. The lead-lag damper is arranged at least in part inside the blade in the proximity of a root zone of the blade. The blade is configured to be connected to a hub of the rotor, e.g. via a spherical abutment and via the lead-lag damper. More precisely, the ball-joint connection of the lead-lag damper is connected to a guide pin secured to a flexible arm of the hub so as to have a degree of freedom to move in translation along the longitudinal axis of the blade.

The spar of the blade may be formed by a bottom branch and by a top branch at the root of the blade, the branches being configured to be connected to the hub, e.g. via the spherical abutment. The lead-lag damper is arranged inside the blade between the two branches, the outer strength member and the inner strength member being secured to the bottom branch and to the top branch of the blade. By way of example, the outer strength member is secured to the bottom branch and to the top branch by means of screws. As a result, the blade also contributes to connecting together the walls of the outer strength member, in particular when these walls are distinct and not connected together by a main partition of the outer strength member.

In addition, since the lead-lag damper is advantageously arranged inside the blade, the skin may form fairing for the blade substantially as far as its root in order to minimize the aerodynamic drag of the blade and the aerodynamic disturbances affecting the blade.

The pitch control of the blade may then be fastened in this root zone directly to the skin of the blade, which is sufficiently rigid, in order to transmit pitch variation to the blade as a whole. As a result, in order to control this pitch variation, there is no need for any mechanical connection, such as a rod, e.g. with the spar of the blade, which connection might degrade the drag of the blade.

Furthermore, the skin may include hatches arranged in register with the lead-lag damper and suitable for uncovering openings in the skin. These openings are configured to enable the lead-lag damper to be viewed. As a result, during maintenance operations, it is possible to inspect the lead-lag damper visually without dismantling it, thus enabling inspection to be fast and saving time during maintenance operations.

Finally, each blade may include a balancing system for balancing the rotor. The balancing system consists in adding or removing small weights such as metal washers to or from the rotor, in particular at a blade. The balancing system is integrated inside each blade, while being accessible without dismantling the skin and/or the blade, other than removing a simple shutter member. The balancing system is thus advantageously protected by the skin of the blade so as to minimize the aerodynamic drag of the blade and so as to minimize the aerodynamic disturbances affecting the blade.

In a variant of the invention, the blade has at least one spar, a skin, and a cuff arranged at the root of the blade and including a bottom branch and a top branch, the branches being configured to be secured firstly to the hub, e.g. via the spherical abutment, and secondly respectively to at least one spar of the blade. The lead-lag damper is arranged inside the cuff, between the two branches, the outer strength member of the lead-lag damper being secured to the bottom branch and to the top branch of the cuff. In this variant, the skin may also form fairing of the blade substantially as far as its root in order to minimize the aerodynamic drag of the blade.

The present invention also provides a rotor of a rotary wing aircraft including the above-specified resilient hinge connection.

Such a rotor comprises:
- a hub driven in rotation and comprising a central body, at least two flexible arms, and a guide pin arranged at an end of each flexible arm;
- at least two blades as described above, each blade being connected to a guide pin via a ball-joint connection of a lead-lag damper; and
- a spherical abutment for each blade connecting the blade to the central body.

The ball-joint connection of each lead-lag damper is preferably connected to a guide pin with a degree of freedom to move in translation along a longitudinal axis of the blade, e.g. by means of a sliding pivot connection.

In a first embodiment, the hub is a single piece. The central body, each flexible arm, and each guide pin thus together form a single component.

By way of example, the hub is made of composite materials or of titanium.

In a second embodiment, the hub comprises at least two distinct components that are secured to each other by means of at least one fastener device. As a result, each component may be made out of a different material that is appropriate for the behavior of that component. For example, the central body, which must in particular withstand centrifugal forces, may be made out of metal in order to limit its dimensions, in particular for heavy aircraft. Likewise, the flexible arm, which must be flexible in order to accompany the angular movement of the blade in part, may for example be made of composite materials or else of titanium. The flexible arm may be secured to the central body by screws.

Finally, the guide pin may be incorporated in the flexible arm or it may be a separate fitted metal guide pin, e.g. made of steel, which is fastened to the flexible arm by means of screws.

BRIEF DESCRIPTION OF THE DRAWINGS

The invention and its advantages appear in greater detail in the context of the following description of embodiments given by way of illustration and with reference to the accompanying figures, in which.

DETAILED DESCRIPTION OF THE INVENTION

Elements present in more than one of the figures are given the same references in each of them.

Figure 1:
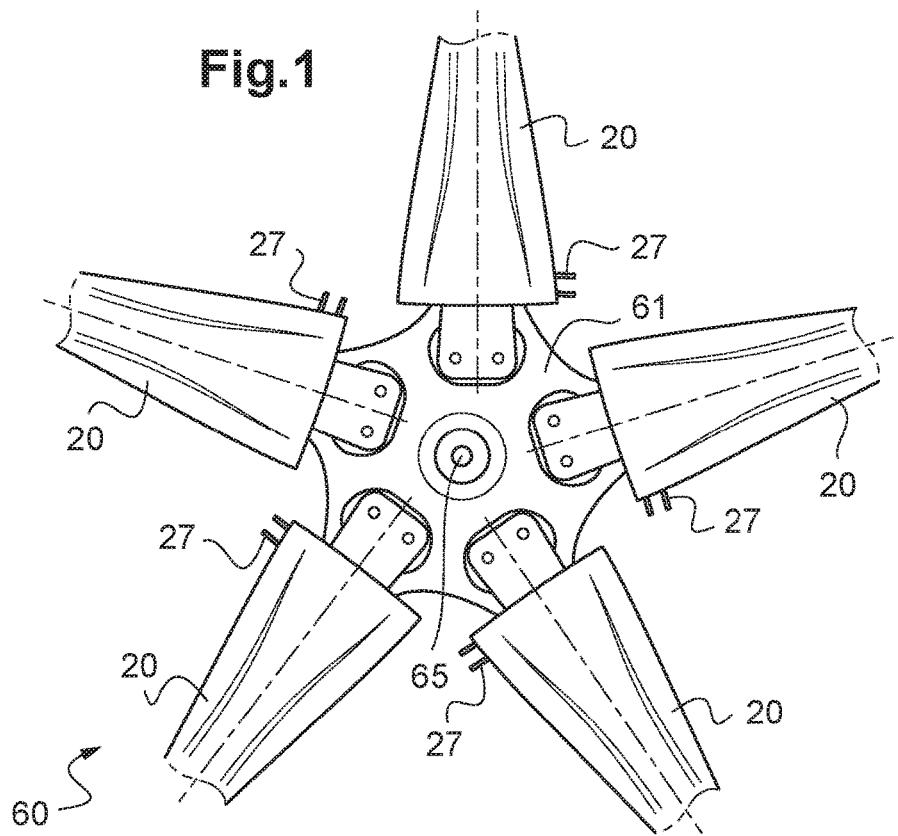
FIG. 1 is an overall view of a rotor of a rotary wing aircraft.

FIG. 1 shows a rotor 60 of a rotary wing aircraft. The rotor 60 comprises a hub 61 connected to five blades 20 and driving these five blades 20 in rotation about an axis of rotation 65 that is substantially vertical. A detail view of the hub 61 is given in FIG. 11, the hub 61 comprising a central body 62, flexible arms 63, and guide pins 64. Detail views of the rotor 60, and in particular of the connection between the hub 61 and the blade 20, are given in FIGS. 8 and 9.

Each blade 20 is connected to the hub 61 via a laminated spherical abutment 68 dedicated to each blade 20 and enabling each blade 20 to move angularly about a flapping axis, a lead-lag axis, and a pitch axis of the blade 20, the pitch axis being situated substantially longitudinally along the span of the blade 20. Each blade 20 is also connected to the hub 61 via a lead-lag damper 1.

Embodiments of a lead-lag damper 1 are shown in FIGS. 2 to 5 and also in FIGS. 7 to 10, with the lead-lag damper 1 then being arranged in the blade 20. In common manner, a lead-lag damper 1 has two strength members 3 and 4, namely an inner strength member 3 having a cage 35 and an outer strength member 4, a ball-joint connection 2, and a member 5 made of elastomer material and arranged between the inner and outer strength members 3 and 4. The ball-joint connection 2 is housed in the cage 35 and the center of the cage 35 corresponds to the center of rotation of the ball-joint connection 2.

Each lead-lag damper 1 also has a longitudinal axis A1, a transverse axis A2, and a vertical axis A3. The longitudinal axis A1 of the lead-lag damper 1 coincides substantially with the longitudinal axis of the blade 20 in which the lead-lag damper 1 is arranged. The transverse axis A2 is substantially perpendicular to the longitudinal axis A1, and the vertical axis A3 is perpendicular to the longitudinal axis A1 and to the transverse axis A2. The point of intersection of these three axes is the center of the cage 35.

A vertical first plane P1 is formed by the transverse axis A2 and the vertical axis A3. This vertical first plane P1 is thus perpendicular to the longitudinal axis A1 and passes through the center of the cage of the inner strength member 3. A vertical second plane P2 is formed by the longitudinal axis A1 and the vertical axis A3. This vertical second plane P2 is perpendicular to the transverse axis A2 and passes through the center of the cage. Finally, a horizontal third plane P3 is formed by the longitudinal axis A1 and the transverse axis A2. This horizontal third plane P3 is perpendicular to the vertical axis A3 and passes through the center of the cage 35.

Figure 3:
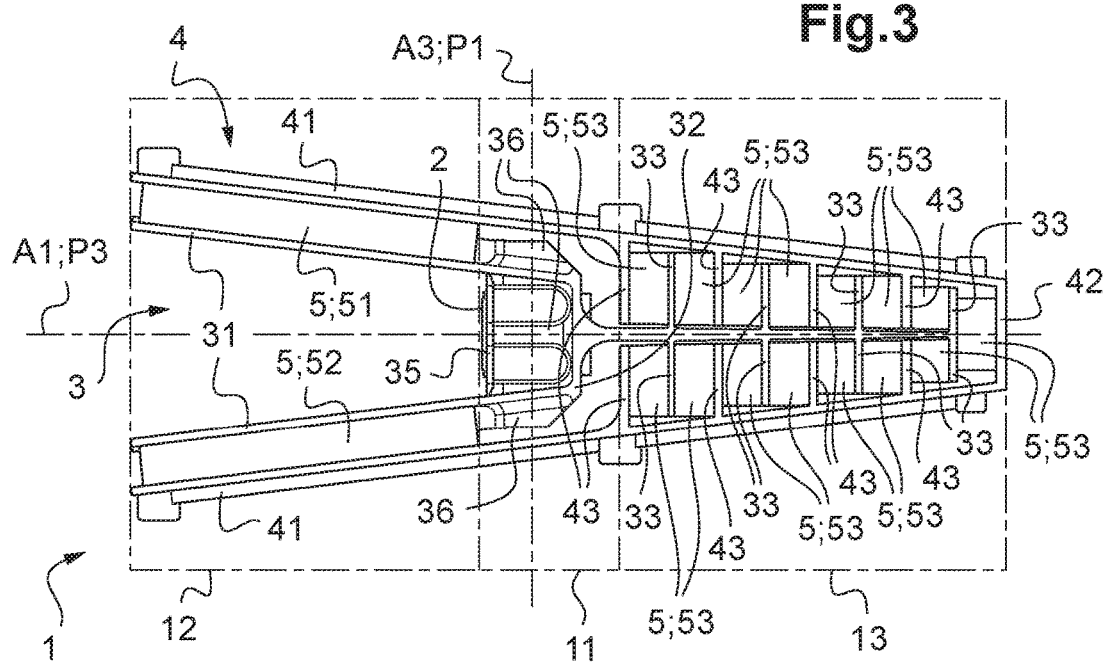

A central zone 11, an upstream zone 12, and a downstream zone 13 are associated with the blade 20 as shown in FIG. 3. The upstream zone 12 is adjacent to the central zone 11 and situated upstream from the central zone 11, while the downstream zone 13 is adjacent to the central zone 11 and situated downstream from the central zone 11. The terms "upstream" and "downstream" should be understood along the longitudinal axis A1 and in the span direction of the blade 20, going from its root towards its free end. It can be seen that the upstream and downstream zones 12 and 13 have a length along the longitudinal axis A1 that is considerably longer than the length of the central zone 11. The cage 35 is positioned in the central zone 11.

The inner strength member 3 has three walls 31 interconnected by a main partition 32. These three walls 31 are parallel to the transverse axis A2. One of these walls 31 is situated for the most part in the downstream zone 13, and the other two walls 31 are situated in the upstream and central zones 12 and 11. The main partition 32 is parallel to the vertical first plane P1 and is situated in the central zone 11.

The outer strength member 4 has two walls 41 parallel to the transverse axis A2 and situated in all three of the central, upstream, and downstream zones 11, 12, and 13. These two walls 41 of the outer strength member 4 are arranged outside the wall 31 of the inner strength member 3.

Figure 2:
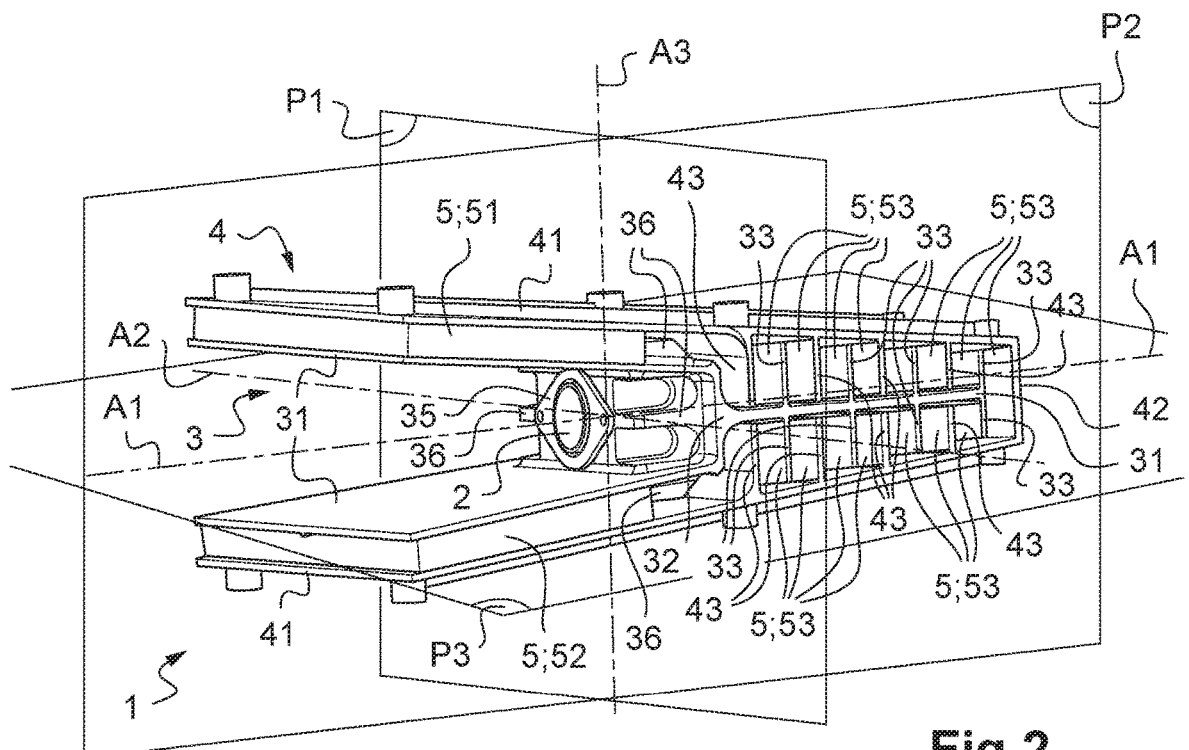
FIGS. 2 to 5 show two embodiments of a lead-lag damper of the invention.

In a first embodiment of a lead-lag damper 1 as shown in FIGS. 2 to 3, the two walls 31 of the inner strength member 3 are situated in the upstream and central zones 11 and 12, and the two walls 41 of the outer strength member 4 slope relative to the horizontal third plane P3. Each of these two walls 31 is parallel to a respective one of the two walls 41. The wall 31 situated for the most part in the downstream zone 13 is parallel to the horizontal third plane P3. Furthermore, the outer strength member 4 has a main partition 42 connecting together the two walls 41. This main partition 42 is parallel to the vertical first plane P1 and is situated in the downstream zone 13, at the ends of the two walls 41.

The inner strength member 3 and the outer strength member 4 also include secondary partitions 33, 43 that are perpendicular to the longitudinal axis A1, and thus parallel to the vertical first plane P1, and they are situated in the downstream zone 13. These secondary partitions 33, 43 are arranged in such a manner that one of the secondary partitions 33 of the inner strength member 3 is situated between the main partition 42 and a secondary partition 43 of the outer strength member 4, and the other secondary partitions 33 of the inner strength member 3 are situated between pairs of secondary partitions 43 of the outer strength member 4.

The elastomer material member 5 has a plurality of blocks 51, 52, 53 of elastomer material arranged in the upstream and downstream zones 12 and 13. In the upstream zone 12, two distinct blocks 51, 52 are arranged respectively between a wall 31 of the inner strength member 3 and a wall 41 of the outer strength member 4. These blocks 51, 52 are secured to each of the walls 31, 41, e.g. by adhesive, and they are of constant thickness. In the downstream zone 13, a plurality of blocks 53 are arranged respectively between a secondary partition 33 of the inner strength member 3 and a secondary partition 43 of the outer strength member 4. A last block 53 is arranged between a secondary partition 33 of the inner strength member 3 and the main partition 42 of the outer strength member 4. All of these blocks 53 are also arranged between a wall 31 of the inner strength member 3 and a wall 41 of the outer strength member 4. These blocks 53 are secured to a main partition 32, 42 or to a secondary partition 33, 43 of each strength member 3, 4, e.g. by adhesive.

In this first embodiment of a lead-lag damper 1 as shown in FIGS. 2 and 3, each block 53 is not in contact with the walls 31, 41 of the two strength members 3, 4. Nevertheless, each block 53 could also be in contact with and secured to these walls 31, 41 of the two strength members 3, 4.

In contrast, no block of the elastomer material member 5 is arranged in the central zone 11. The inner strength member 3 has fins 36 arranged in this central zone 11 and in the proximity of and around the cage 35. These fins 36, which can be seen in FIG. 3, serve both to dissipate the heat generated in the ball-joint connection 2 during angular movements of the blade 20, and also to increase the mechanical strength of the inner strength member 3.

In this first embodiment, the cage 35 is fitted to the inner strength member 3 in the central zone 11 and is secured to the inner strength member 3, as shown in FIGS. 2 and 3.

Figure 4:
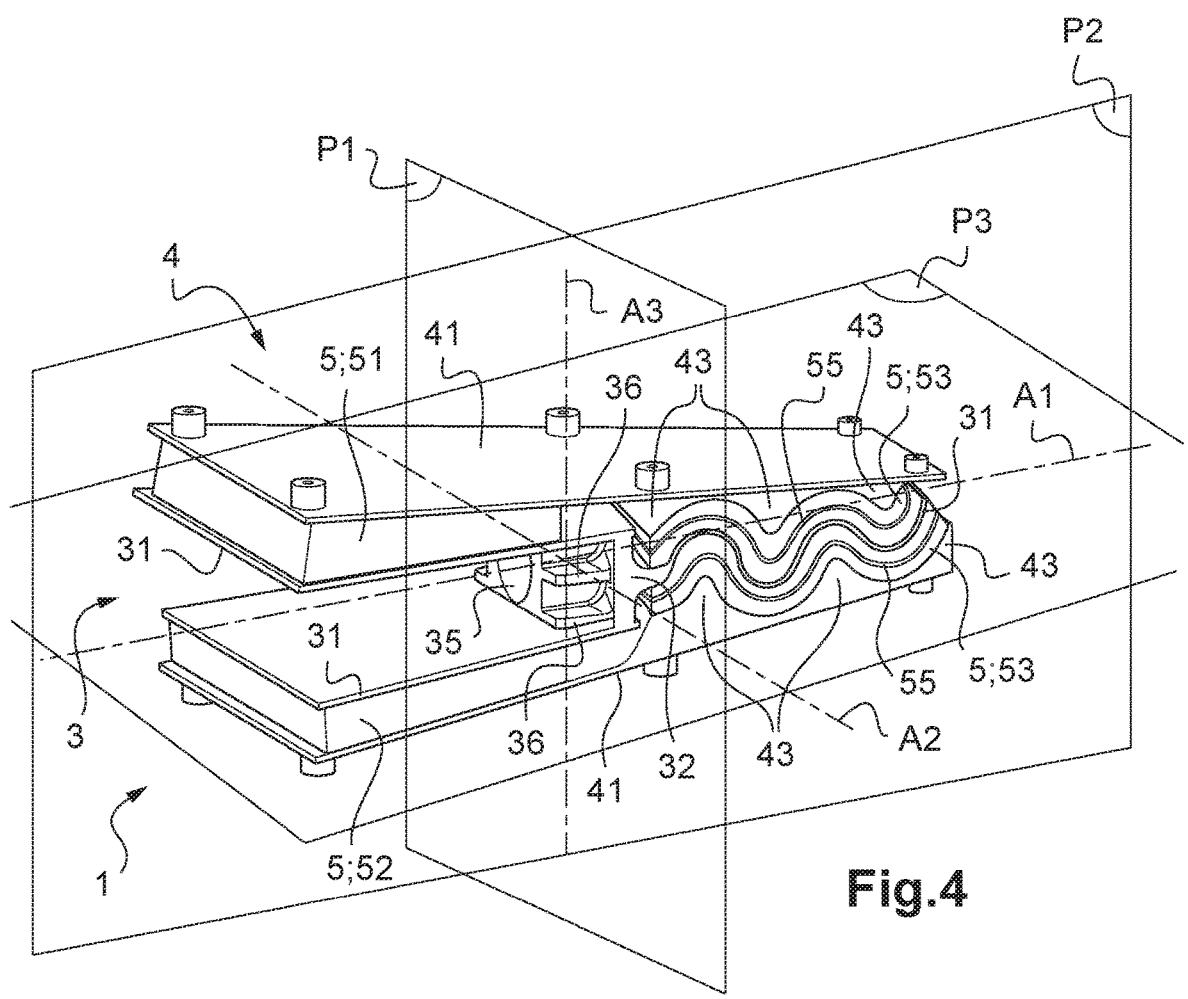
Figure 5:
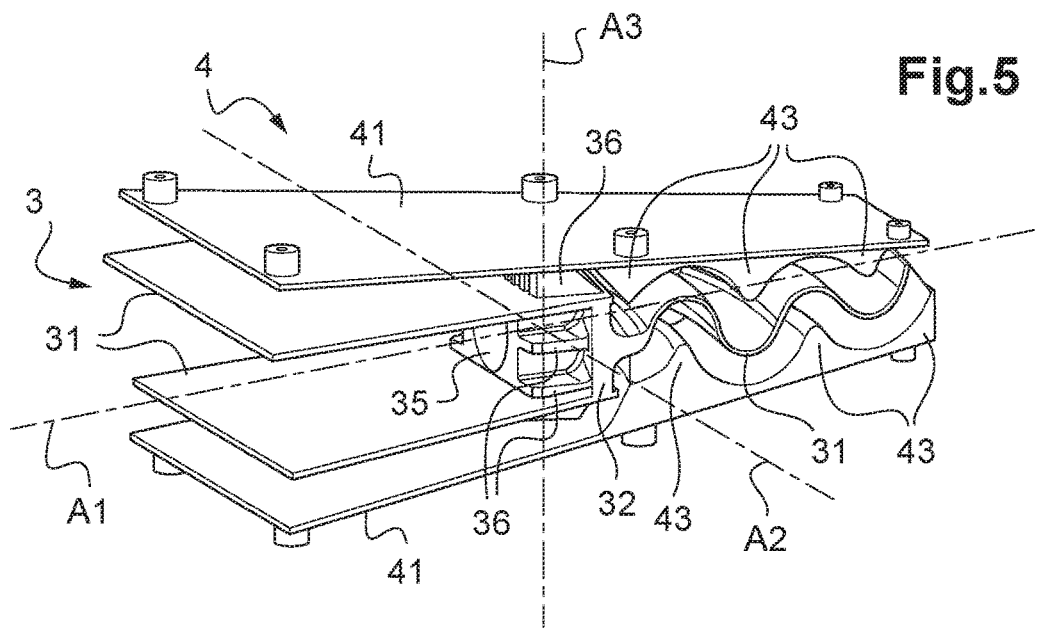

In the second embodiment of a lead-lag damper 1, as shown in FIGS. 4 and 5, the cage 35 is integrated in the inner strength member 3 and the ball-joint connection 2 is not shown. The two walls 31 of the inner strength member 3 that are situated in the upstream and central zones 12 and 11, and the two walls 41 of the outer strength member 4, all slope relative to the horizontal third plane P3, but they are not parallel to each other. Consequently, the thickness of the blocks 51, 52 of the elastomer material member 5 that are arranged between these walls 31, 41 in the upstream zone 12 diminishes going along the longitudinal axis A1 from upstream to downstream.

The wall 31 situated for the most part in the downstream zone 13 has an undulating shape, e.g. a sinusoidal shape along the longitudinal axis A1 as shown in FIGS. 4 and 5. Furthermore, this wall 31 of undulating shape is also circular in shape about an axis substantially parallel to the vertical axis A3, as can be seen in FIG. 5 where the elastomer material member 5 has been omitted. This axis substantially parallel to the vertical axis A3 passes through the focal point of the spherical abutment 68 when the lead-lag damper 1 is arranged in a blade 20.

Furthermore, the outer strength member 4 has secondary partitions 43 secured to each wall 41. These secondary partitions 43 are complementary to the walls 31, such that the elastomer material member 5 arranged between the wall 31 of undulating shape and the outer strength member 4 comprises, in the downstream zone 13, two blocks 53 that are of constant thickness. Furthermore, each of these two blocks 53 includes an insert 55 embedded in the block 53 of elastomer material serving to increase the stiffness of these two elastomer material blocks 53. In addition, the two walls 41 and the outer strength member 4 are distinct and connected together by the elastomer material member 5 and the inner strength member 3.

Figure 9:
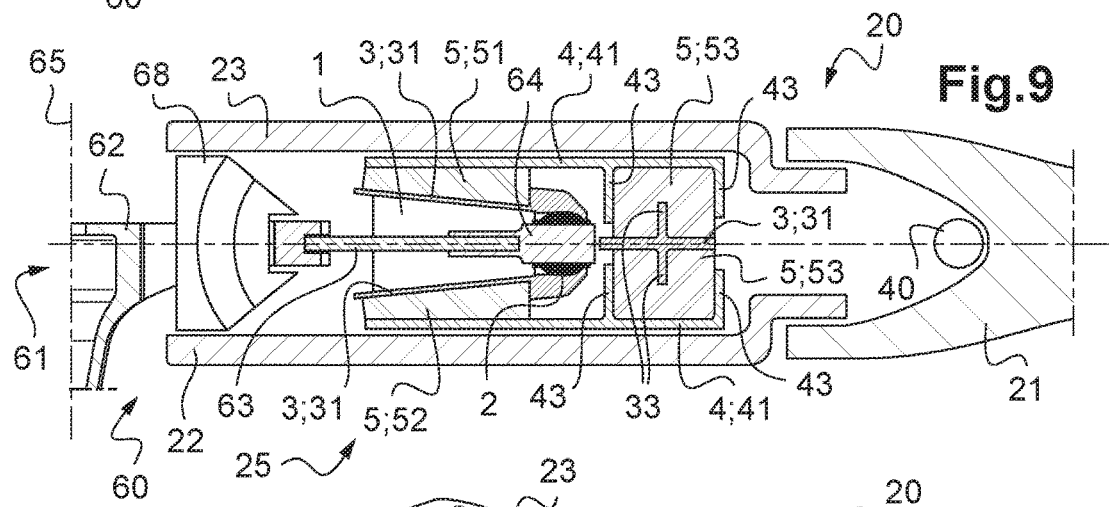

Finally, in the third embodiment of a lead-lag damper 1, as shown in FIG. 9, the lead-lag damper 1 is arranged inside a blade 20, and more precisely inside a cuff 25 of the blade 20. The two walls 31 of the inner strength member 3 situated in the upstream and central zones 12 and 11 slope relative to the horizontal third plane P3, while the two walls 41 of the outer strength member 4 are parallel to the horizontal third plane P3. Consequently, the walls and 41 of each strength member 3, 4 are not parallel to each other, and the blocks 51, 52 of the elastomer material member 5 arranged between these walls 31, 41 in the upstream zone 12 are of thickness that increases along the longitudinal axis A1 going from upstream to downstream.

The wall 31 of the outer strength member 3 that is situated for the most part in the downstream zone 13 is parallel to the horizontal third plane P3 and thus parallel to the two walls 41 of the outer strength member 4. Each wall 41 of the outer strength member 4 has two secondary partitions 43, and the inner strength member 3 has two secondary partitions 33 secured to the wall 31 that is situated for the most part in the downstream zone 13.

As a result, in the upstream zone 12, two distinct blocks 51 and 52 are arranged respectively between a wall 31 of the inner strength member 3 and a wall 41 of the outer strength member 4. These blocks 51, 52 are secured to each of the walls 31, 41. In the downstream zone 13, two blocks 53 are arranged respectively between a wall 31 of the inner strength member 3 and a wall 41 of the outer strength member 4, and between the two secondary partitions 43 of the outer strength member 4. These blocks 53 are secured to each wall 31, 41 and to secondary partitions 33, 43 of each strength member 3, 4. Each block 53 includes a slot in which a secondary partition 33 of the inner strength member 3 is positioned.

Figure 6:
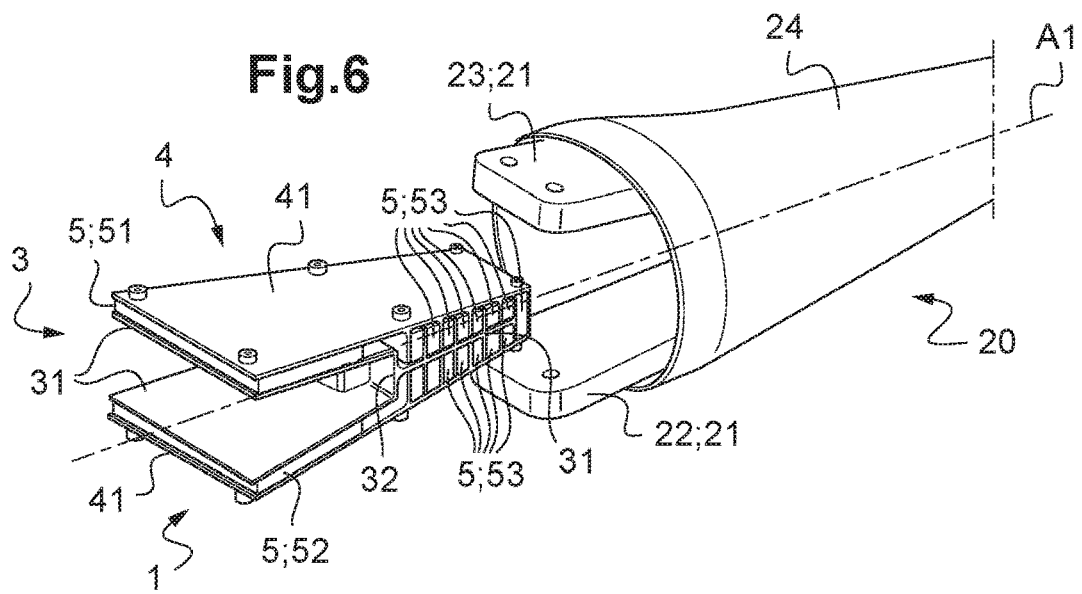
FIGS. 6 and 7 show a blade fitted with such a lead-lag damper.
Figure 7:
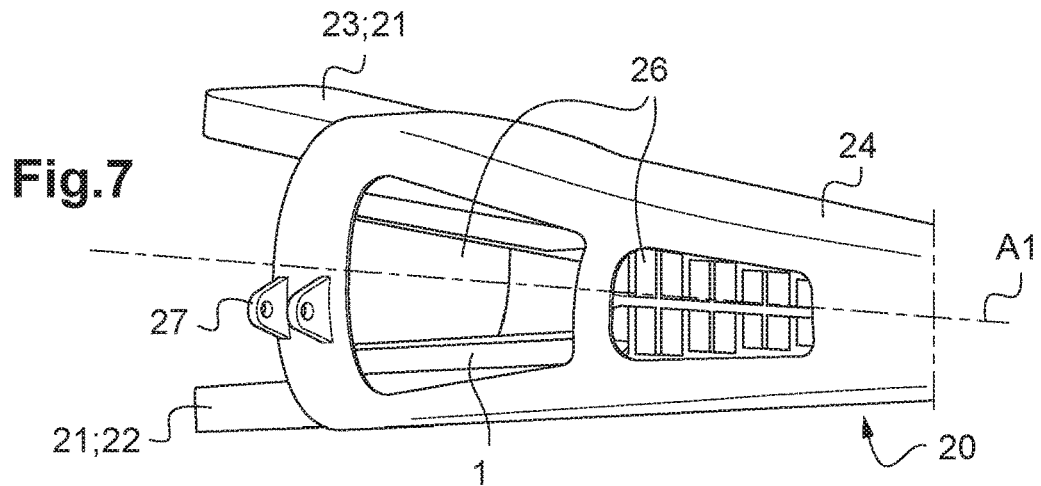
Figure 8:
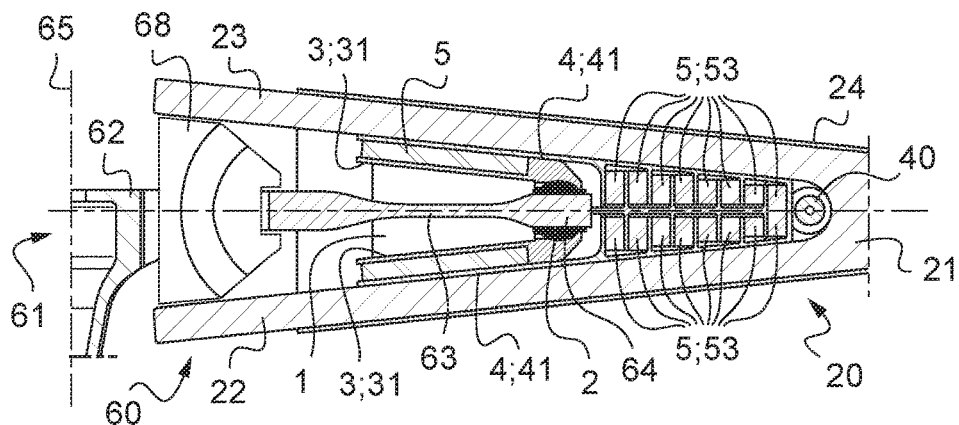
FIGS. 8 and 9 are detail views of the rotor.
Figure 10:
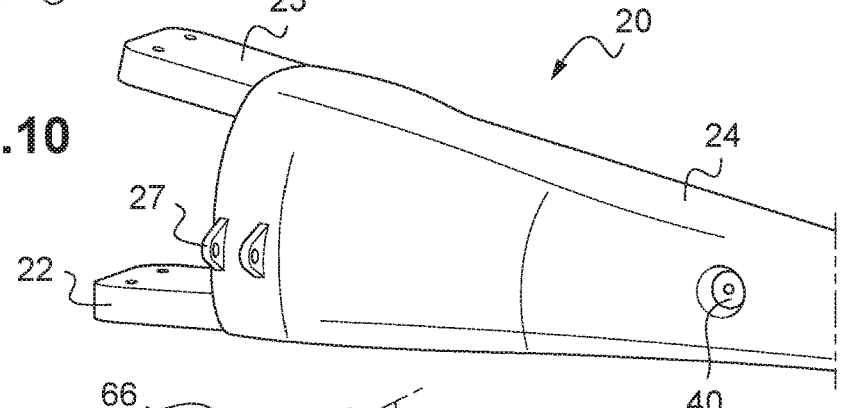
FIG. 10 is a view of a blade.

This lead-lag damper 1 is arranged inside a blade 20, as shown in FIGS. 6 to 8, and in FIG. 10.

The blade 20 includes a spar 21 and a skin 24. The spar 21 has a bottom branch 22 and a top branch 23 in the root zone of the blade 20. The bottom branch 22 and the top branch 23 thus form a fork within which the lead-lag damper 1 is arranged. The outer strength member 4 is secured respectively to the bottom branch 22 and to the top branch 23, e.g. by screws.

The blade 20 is connected to the hub 61 of the rotor 60 by a laminated spherical abutment 68 and via a lead-lag damper 1. More precisely, the bottom and top branches 22 and 23 of the spar 21 enable the blade 20 to be connected to the hub 61 via the spherical abutment 68. In addition, the ball-joint connection 2 of the lead-lag damper 1 is connected to a guide pin 64 secured to a flexible arm 63 of the hub 61. The ball-joint connection 2 is connected to the guide pin 64 via a sliding pivot connection.

Once the lead-lag damper 1 is arranged in the blade 20, the longitudinal axis A1 of the lead-lag damper 1 coincides substantially with the longitudinal axis of the blade 20. The transverse axis A2 extends transversely from a leading edge to a trailing edge of the blade 20.

The lead-lag damper 1 thus serves to damp movements of the blade 20 that are situated mainly in a plane perpendicular to the axis of rotation of the hub 61 of the rotor 60, about its lead-lag axis. Specifically, such movements generate relative movements between the two strength members 3 and 4, thereby deforming the elastomer material member 5 and causing induced forces to appear that are substantially parallel to the transverse axis A2. Advantageously, the walls 31, 41 are arranged parallel to the transverse axis A2. Consequently, each block 51, 52, 53 of the elastomer material member 5 is stressed mainly in shear by the relative movements between the two strength members 3 and 4, and it can therefore damp the movements of the blade 20.

In addition, the distribution of the blocks 51, 52, 53 of the elastomer material member 5 on both sides of the cage 35 is configured so that the forces induced by the deformations of the elastomer material member 5 as a result of these relative movements between the two strength members 3 and 4 are distributed uniformly on both sides of the cage 35, at least relative to the vertical first plane P1 passing through the center of the cage 35. As a result, the forces induced by the deformations of the blocks 51, 52, 53 of the elastomer material member 5 as a result of the relative movements between the two strength members 3 and 4 caused by the movements of the blade 20 are oriented mainly parallel to the transverse axis A2 and they are distributed in substantially uniform and balanced manner on both sides of the cage 35 relative to this vertical first plane P1. The lead-lag damper 1 thus makes it possible to limit or even avoid additional parasitic forces appearing within the blade 20, and mainly at the laminated spherical abutment 68, during such movements of the blade 20, thereby serving to ensure stability of the rotary wing aircraft and prevent possible phenomena of ground resonance and of air resonance.

Preferably, this distribution of the blocks 51, 52, 53 on both sides of the cage 35 is such that the center of gravity of the forces induced by the deformations of the elastomer material member 5 as a result of the relative movements of the two strength members 3 and 4 is situated at the center of the cage 35.

In a variant blade shown in FIG. 9, the blade 20 has a cuff 25 arranged in a root zone of the blade 20. The cuff 25 comprises a bottom branch 22 and a top branch 23 enabling the blade 20 to be secured to the hub 61. These bottom and top branches 22 and 23 are parallel to each other and connected firstly to the hub 61 via the laminated spherical abutments 68 and secondly to the spar 21. The lead-lag damper 1 is arranged inside the cuff 25 between the bottom branch 22 and the top branch 23, the outer strength member 4 being secured to the bottom and top branches 22 and 23 of the cuff 25.

The behavior of the lead-lag damper 1 arranged in this variant of the blade 20 is substantially identical to that of a lead-lag damper 1 arranged in a blade 20 without a cuff 25, and thus makes it possible to limit or indeed eliminate parasitic forces appearing in the blade 20 and in particular in the laminated spherical abutment 68.

The outside surface of the skin 24 is constituted for the most part by a continuous succession of streamlined profiles. The skin 24 goes as far as the root zone of the blade 20 in order to fair the blade 20 as far as its root. The aerodynamic drag of the blade 20 is thus reduced, as are the aerodynamic disturbances that affect the blade 20. Pitch control means 27 are fastened directly to the skin 24 of the blade 20 in the proximity of the root of the blade 20.

Furthermore, as can be seen in FIG. 7, the skin 24 has openings 26 enabling the lead-lag damper 1 to be inspected visually without dismantling the blade 20. While the blade 20 is in use, hatches (not shown) are used to close these openings 26 so as to avoid degrading the aerodynamic performance of the blade 20.

The blade 20 also has a balancing system 40 for balancing the rotor 60. The balancing system 40 is integrated inside each blade 20 and comprises a shutter (not shown) for minimizing the aerodynamic drag of the blade 20 and the aerodynamic disturbances that might be generated by a balancing system located outside the blade 20.

It should also be observed that the hub 61 of the rotor 60 may be a single piece, as shown in FIG. 8. It can be seen that the thickness of the flexible arm 63 varies along the longitudinal direction of the blade 20 in order to allow a certain amount of bending to the flexible arm 63 while conserving sufficient stiffness at the central body 62. Such a single-piece hub 61 may be made of titanium, for example.

Figure 11:
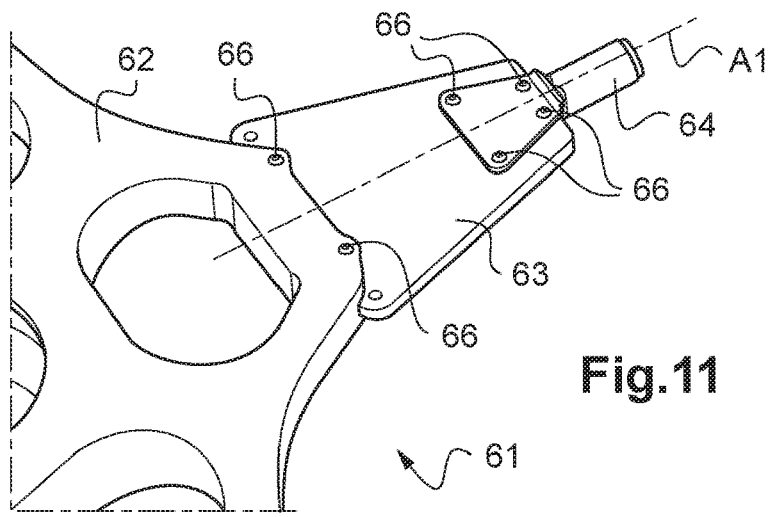
FIG. 11 shows a hub of the rotor.

The hub 61 may also be made up of distinct components that are secured to one another by at least one fastener device, as shown in FIGS. 9 and 11. The flexible arm 63 is thus fastened to the central body 62 by screws 66, and the guide pin 64 is fastened to the flexible arm 63 likewise by screws 66. Each component may thus be made out of the most appropriate material. For example, titanium or steel for the central body 62, composite materials or titanium for the flexible arms 63, and steel or titanium for the guide pin 64.

Naturally, the present invention may be subjected to numerous variations as to its implementations. Although several embodiments are described, it will readily be understood that it is not conceivable to identify exhaustively all possible embodiments. It is naturally possible to envisage replacing any of the means described by equivalent means without going beyond the ambit of the present invention.

For example, the lead-lag damper 1 is not limited to use with a rotor 60 having five blades 20, but it can also be used with a rotor 60 having some arbitrary number of blades 20 greater than or equal to two. Likewise, the walls 31, 41 of the two strength members 3, 4 of the lead-lag damper 1 are not restricted to surfaces that slope relative to the horizontal third plane P3. These walls 31, 41 could equally well be parallel to the horizontal third plane P3 when the shape of the blade 20 in which the lead-lag damper 1 is arranged makes that possible.

What is claimed is:

1. A lead-lag damper for a blade of a rotor of a rotary wing aircraft, the rotor being provided with a hub that is driven in rotation, the lead-lag damper comprising:
   a longitudinal axis;
   a ball-joint connection for connecting to the hub;
   two strength members, one of the two strength members is an inner strength member and being provided with a cage in which the ball-joint connection is arranged, the other of the two strength members is an outer strength member and being securable to the blade; and a member made of elastomer material that is arranged between the inner strength member and the outer strength member;

each of the two strength members and the elastomer material member being arranged on opposite sides of the cage;

the inner strength member and the outer strength member each having at least two walls and at least one secondary partition in contact with the elastomer material member and configured so as to increase contact areas between the elastomer material member and the two strength members, the inner strength member including at least one main partition connecting together the at least two walls of the inner strength member;

wherein the at least one secondary partition of the inner strength member and the at least one secondary partition of the outer strength member subdivide the elastomer material member into a plurality of distinct blocks of elastomer material, the blocks being situated between the at least one secondary partition of the inner strength member and the at least one secondary partition of the outer strength member or between the at least one main partition and one of the at least one secondary partition of the inner strength member and the at least one secondary partition of the outer strength member so that relative movements between the two strength members as a result of movements of the blade are damped by deformations of the elastomer material member, the lead-lag damper being arrangeable at least in part inside the blade.

2. The lead-lag damper according to claim 1, wherein the two strength members and the elastomer material member extend, at least along the longitudinal axis, beyond a central zone in which the cage is situated, the central zone longitudinally occupying a length not less than the length of the cage.

3. The lead-lag damper according to claim 2, wherein the lead-lag damper includes along the longitudinal axis an upstream zone situated upstream from the central zone, and a downstream zone situated downstream from the central zone, the two strength members arranged in the upstream, central, and downstream zones and the elastomer material member arranged in at least the upstream and downstream zones.

4. The lead-lag damper according to claim 2, wherein the lead-lag damper includes along the longitudinal axis an upstream zone situated upstream from the central zone, and a downstream zone situated downstream from the central zone and wherein the elastomer material member is not arranged in the central zone.

5. The lead-lag damper according to claim 4, wherein the inner strength member has fins arranged in the central zone so as to dissipate heat generated in the ball-joint connection.

6. The lead-lag damper according to claim 1, wherein the outer strength member includes at least one main partition connecting together the at least two walls of the outer strength member, the blocks of the elastomer material member being situated between the at least one secondary partition of the inner strength member and the at least one secondary partition of the outer strength member, or else between one of the at least one main partition of the inner and outer strength members and one of the at least one secondary partition of the inner strength member and the at least one secondary partition of the outer strength member.

7. The lead-lag damper according to claim 1, wherein the at least two walls of the outer strength member are connected together via the inner strength member and the elastomer material member.

8. The lead-lag damper according to claim 1, wherein the outer strength member includes at least one main partition, wherein the elastomer material member has at least two distinct blocks of the plurality of distinct blocks of elastomer material, each block adhering to at least one wall of the at least two walls of the inner and outer strength members or to the at least one main partition of the at least one secondary partition of the inner strength member and to at least one wall of the at least two walls or to one of the at least one main partition and the secondary partition of the outer strength member.

9. The lead-lag damper according to claim 1, wherein at least one block of the plurality of distinct blocks of the elastomer material member is arranged between the inner strength member and the outer strength member such that the at least one block is of constant section as defined perpendicularly to a middle line of the block.

10. The lead-lag damper according to claim 1, wherein at least one block of the plurality of distinct blocks of the elastomer material member is arranged between the inner strength member and the outer strength member in such a manner that the at least one block has a varying section as defined perpendicularly to a middle line of the block so that the at least one block is stressed uniformly during the relative movements between the inner strength member and the outer strength member.

11. The lead-lag damper according to claim 1, wherein at least one block of the elastomer material member includes an insert embedded in the block so as to improve the stiffness of the block.

12. The lead-lag damper according to claim 1, wherein the outer strength member includes at least one main partition, wherein the two strength members include at least one wall of the at least two walls of the inner strength member and of the at least two walls of the outer strength member and/or at least one partition of the at least one main partition and of the at least one secondary partition of the inner strength member and of the at least one main partition and of the at least one secondary partition of the outer strength member parallel to a transverse axis of the lead-lag damper, the transverse axis being perpendicular to the longitudinal axis.

13. The lead-lag damper according to claim 1, wherein the outer strength member includes at least one main partition, wherein the two strength members comprise at least one wall of the at least two walls of the inner strength member and of the at least two walls of the outer strength member and/or at least one partition of the at least one main partition and of the at least one secondary partition of the inner strength member and of the at least one main partition and of the at least one secondary partition of the outer strength member constituted by shapes that are not planar.

14. The lead-lag damper according to claim 1, wherein the elastomer material member is distributed on the opposite sides of the cage, where the ball-joint connection has a center of rotation and the cage has a center corresponding to the center of rotation of the ball-joint connection, the elastomer material member is configured in such a manner that forces induced by the deformations of the elastomer material member as a result of the relative movements of the two strength members are distributed uniformly on the opposite sides of the cage, at least relative to a vertical first plane perpendicular to the longitudinal axis passing through the center of the cage.

15. The lead-lag damper according to claim 1, wherein the elastomer material member is distributed on the opposite sides of the cage, the ball-joint connection has a center of rotation and the cage having a center corresponding to the center of rotation of the ball-joint connection, is configured so that a center of gravity of forces induced by the deformations of the elastomer material member resulting from the relative movements of two strength members is situated at the center of the cage such that forces induced by the deformations of the elastomer material member are distributed uniformly and in balanced manner on the opposite sides of the cage relative to a vertical first plane perpendicular to the longitudinal axis and passing via the center of the cage, relative to a vertical second plane perpendicular to a transverse axis of the lead-lag damper and passing via the center of the cage, and relative to a horizontal third plane perpendicular to a vertical axis of the lead-lag damper and passing via the center of the cage, the transverse axis being perpendicular to the longitudinal axis, and the vertical axis being perpendicular to the transverse axis and to the longitudinal axis.

16. A blade having a skin and at least one spar configured to be connected to a hub of a rotor of an aircraft, wherein the blade includes the lead-lag damper according to claim 1 and the lead-lag damper is arranged at least in part inside the blade.

17. The blade according to claim 16, wherein the at least one spar includes a bottom branch and a top branch in a root zone of the blade, the bottom and top branches being configured to be connected to the hub, the lead-lag damper being arranged inside the blade between the bottom branch and the top branch, the outer strength member of the lead-lag damper being secured to the bottom branch and to the top branch.

18. The blade according to claim 16, wherein the blade includes a cuff arranged in a root zone of the blade, the cuff comprising a bottom branch and a top branch, the bottom and top branches being configured to be secured firstly to the hub and secondly to the at least one spar of the blade, the lead-lag damper being arranged inside the cuff between the bottom branch and the top branch, the outer strength member of the lead-lag damper being secured to the bottom and top branches of the cuff.

19. The blade according to claim 16, wherein the skin fairs the blade to its root in order to minimize the aerodynamic drag of the blade and the skin includes openings configured to enable the lead-lag damper to be viewed.

20. The blade according to claim 16, wherein the blade is configured for balancing the rotor that is integrated inside the blade in order to minimize aerodynamic drag of the blade and aerodynamic disturbances that affect the blade.

21. A rotary wing aircraft rotor comprising:
a hub driven in rotation about an axis of rotation and comprising a central body, at least two flexible arms and a guide pin for each flexible arm;
at least two blades, wherein each blade of the at least two blades is in accordance with the blade of claim 16, the ball-joint connection of the lead-lag damper of each blade being connected to a guide pin of the rotor; and
a spherical abutment for each blade of the at least two blades connecting each blade of the at least two blades to the hub.

22. The rotor according to claim 21, wherein the hub comprises at least two distinct components of the central body, the flexible arms and the guide pin that are secured together by at least one fastener, the central body being distinct from the flexible arms.

* * * * *